United States Patent
Velasco

(10) Patent No.: US 10,471,996 B2
(45) Date of Patent: Nov. 12, 2019

(54) SUPPORTING STRUCTURE FOR A FRONT-END MODULE OF A MOTOR VEHICLE AND FRONT-END MODULE COMPRISING SAID SUPPORTING STRUCTURE

(71) Applicant: Valeo Systemes Thermiques, Le Mesnil Saint Denis (FR)

(72) Inventor: Sébastien Velasco, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 15/738,165

(22) PCT Filed: Jun. 1, 2016

(86) PCT No.: PCT/EP2016/062422
§ 371 (c)(1),
(2) Date: Dec. 20, 2017

(87) PCT Pub. No.: WO2016/206936
PCT Pub. Date: Dec. 29, 2016

(65) Prior Publication Data
US 2018/0178848 A1    Jun. 28, 2018

(30) Foreign Application Priority Data
Jun. 22, 2015   (FR) ..................................... 15 55685

(51) Int. Cl.
B62D 25/08    (2006.01)
B62D 29/00    (2006.01)

(52) U.S. Cl.
CPC ......... B62D 25/085 (2013.01); B62D 29/004 (2013.01)

(58) Field of Classification Search
CPC ........................... B62D 25/085; B62D 29/004
(Continued)

(56) References Cited

U.S. PATENT DOCUMENTS 6,216,810 B1 * 4/2001 Nakai ................. B29C 37/0085
 180/68.4
6,547,317 B1 * 4/2003 Cheron ................ B62D 25/084
 180/68.4

(Continued)

FOREIGN PATENT DOCUMENTS

DE    10 2011 016936 A1    12/2011
EP    1 036 729 A1    9/2000
(Continued)

OTHER PUBLICATIONS

Machine Translation of FR-6014813, printed from the EPO website, May 2, 2019.*

(Continued)

*Primary Examiner* — Jason S Morrow
(74) *Attorney, Agent, or Firm* — Osha Liang LLP

(57) ABSTRACT

The invention relates to a supporting structure (10) for a front-end module of a motor vehicle, said supporting structure (10) comprising a lower crossmember (12), a first side post (14), a second side post (16) and an upper crossmember (18) so as to define a frame, said upper crossmember (18) being made of a hybrid material comprising a plastic material and a metal material. The invention also relates to a front-end module comprising one such supporting structure (10).

5 Claims, 3 Drawing Sheets

(58) Field of Classification Search
USPC .......................................... 296/193.09, 193.1
See application file for complete search history.

(56) References Cited

U.S. PATENT DOCUMENTS

| | | | | |
|---|---|---|---|---|
| 2004/0011513 A1* | 1/2004 | Haneda | ................ | B62D 25/084 |
| | | | | 165/148 |
| 2004/0046422 A1* | 3/2004 | Igura | ................ | B29C 45/14311 |
| | | | | 296/193.09 |
| 2005/0140173 A1* | 6/2005 | Riviere | ............ | B29C 45/14311 |
| | | | | 296/187.01 |
| 2005/0252704 A1* | 11/2005 | Kim | .................... | B62D 25/084 |
| | | | | 180/68.4 |
| 2005/0253419 A1* | 11/2005 | Kwon | ................ | B62D 25/084 |
| | | | | 296/193.09 |
| 2007/0139940 A1* | 6/2007 | Jung | .................... | B62D 25/084 |
| | | | | 362/460 |
| 2008/0038576 A1* | 2/2008 | Riviere | ............ | B29C 45/14311 |
| | | | | 428/586 |
| 2009/0026806 A1* | 1/2009 | Riviere | ............... | B29C 45/1418 |
| | | | | 296/193.09 |
| 2009/0212600 A1* | 8/2009 | Fischer | ................ | B62D 25/084 |
| | | | | 296/193.09 |
| 2014/0284966 A1* | 9/2014 | Maier | .................. | B62D 25/085 |
| | | | | 296/193.04 |
| 2016/0023623 A1* | 1/2016 | Diehl | .................... | B62D 27/06 |
| | | | | 293/133 |

FOREIGN PATENT DOCUMENTS

| | | |
|---|---|---|
| EP | 2 284 066 A2 | 2/2011 |
| FR | 2 783 794 A1 | 3/2000 |
| FR | 3 014 813 A1 | 6/2015 |
| FR | 3014813 A1 * | 6/2015 ........... B62D 25/084 |

OTHER PUBLICATIONS

International Search Report issued in PCT/EP2016/062422 dated Sep. 13, 2016 (3 pages).
Written Opinion of the International Searching Authority issued in PCT/EP2016/062422 dated Sep. 13, 2016 (7 pages).

* cited by examiner

SUPPORTING STRUCTURE FOR A FRONT-END MODULE OF A MOTOR VEHICLE AND FRONT-END MODULE COMPRISING SAID SUPPORTING STRUCTURE

FIELD OF THE INVENTION

The present invention relates to a front end module for a motor vehicle and, more specifically, to a supporting structure suited to such a front end module.

PRIOR ART

In general, within a motor vehicle, a front end module is a structural element intended to contain a plurality of devices necessary to the operation of the motor vehicle, such as headlamps or heat exchangers. At the end of the production of a front end module, the latter may be assembled directly onto the motor vehicle, notably with elements of the chassis of the motor vehicle such as the longitudinal side rail members. The front end module may also be mounted on the motor vehicle by assembling it with a front bumper or frontal panel.

In the known way, the front end module comprises a supporting structure intended to accept the devices necessary for the operation of the motor vehicle, and a bumper beam to protect said devices in a frontal collision between a pedestrian and the motor vehicle. The supporting structure of the front end module comprises various components joined together. Thus, the supporting structure comprises a lower crossmember, lateral uprights for said lower crossmember, an upper crossmember designed to be fixed to the top of the lateral uprights and reinforcing arms fixed to the ends of the upper crossmember and/or to the lateral uprights.

In general, such a supporting structure is made entirely from a strong material such as steel, so as to comply with the standards laid down by automotive safety legislation in a frontal collision between a pedestrian and a motor vehicle. However, such a supporting structure represents a not-insignificant weight within the motor vehicle and causes a high fuel consumption and a high level of carbon dioxide ($CO_2$) emissions.

It has therefore proved necessary to improve the design of a front end module supporting structure according to the prior art in order to optimize the operation of the motor vehicle while at the same time conforming to the standards relating to motor vehicle safety legislation.

SUBJECT OF THE INVENTION

The front end module support and the front end module comprising said support according to the present invention seek to overcome the abovementioned disadvantages.

Thus, a first subject of the invention relates to a supporting structure for a motor vehicle front end module, said supporting structure comprising a lower crossmember, a first lateral upright, a second lateral upright and an upper crossmember so as to define a frame, said upper crossmember being formed of a hybrid material comprising a plastics material and a metallic material. In other words, the uprights are arranged in such a way as to join the crossmembers together.

Advantageously, the upper crossmember comprises an insert made from a metallic material and covered with a plastics material.

Advantageously, the supporting structure comprises a support wing fixed to one end of the upper crossmember.

Advantageously, the support wing is made of a metallic material.

Advantageously, the supporting structure comprises a support piece for connecting said support wing to the supporting structure.

Advantageously, the support piece comprises an insert made of a hybrid material comprising a plastics material and a metallic material.

A second subject of the invention relates to a front end module comprising a supporting structure according to the features hereinabove.

BRIEF DESCRIPTION OF THE DRAWINGS

The objects, subject matter and features of the present invention and the advantages thereof will become more clearly apparent from reading the following description of some preferred embodiments of the invention which is given with reference to the drawings in which.

DETAILED DESCRIPTION OF THE EMBODIMENTS

The following detailed description is aimed at explaining the invention in a manner that is sufficiently clear and complete, notably using examples, but must not be considered to limit the scope of protection to the particular embodiments and examples set out hereinbelow.

Figure 1:
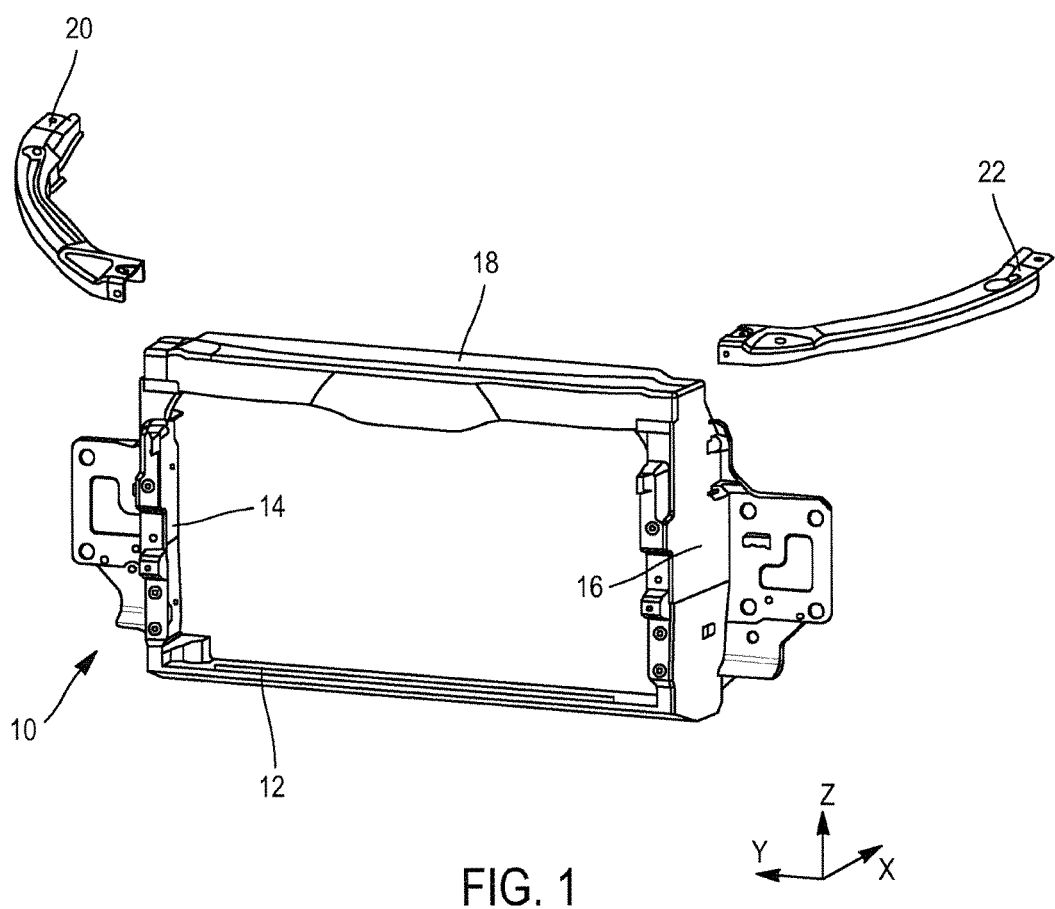
FIG. 1 shows an exploded perspective view of a supporting structure for a front end module, according to a first embodiment of the invention.

FIG. 1 shows a supporting structure 10 for a front end module (not shown) of a motor vehicle. The supporting structure 10 comprises a lower crossmember 12, a first lateral upright 14, a second lateral upright 16 and an upper crossmember 18 which are assembled by means of connections, such as screws, to form a closed structure. The lower crossmember 12, the first lateral upright 14 and the second lateral upright 16 are made entirely from a plastics material, such as 40% long-strand glass fiber reinforced polypropylene. Thus, the supporting structure 10 is, in relative terms, more lightweight than a supporting structure according to the prior art. The upper crossmember 18 comprises an insert (not shown) of tubular shape, for example, made from a metallic material, such as steel, and covered, by the end of an overmolding process, with a plastics material such as polypropylene with a 40% content of long-strand glass fiber reinforcing fibers. The upper crossmember 18 therefore comprises a hybrid material formed of a metallic material and of a plastics material. The dimensions of the insert are determined in such a way that the level of stiffness and strength of the supporting structure 10 complies with the standards laid down by automotive safety legislation for a frontal collision between a motor vehicle and a pedestrian. The insert may constitute either the entirety or just part of the upper crossmember 18. The insert thus incorporated into the upper crossmember 18 also acts as a reinforcing plate to prevent the hood of the motor vehicle from springing open in a frontal impact between the motor vehicle and a pedestrian. The supporting structure 10 also comprises a first support wing 20 and a second support wing 22 which are shown in FIG. 1. The first and second support wings 20, 22 are designed to be connected to each end of the upper crossmember 18 by means of connections such as screws. The first and second support wings 20, 22 may be formed using a pressing method, from a material such as aluminum or steel.

Figure 2:
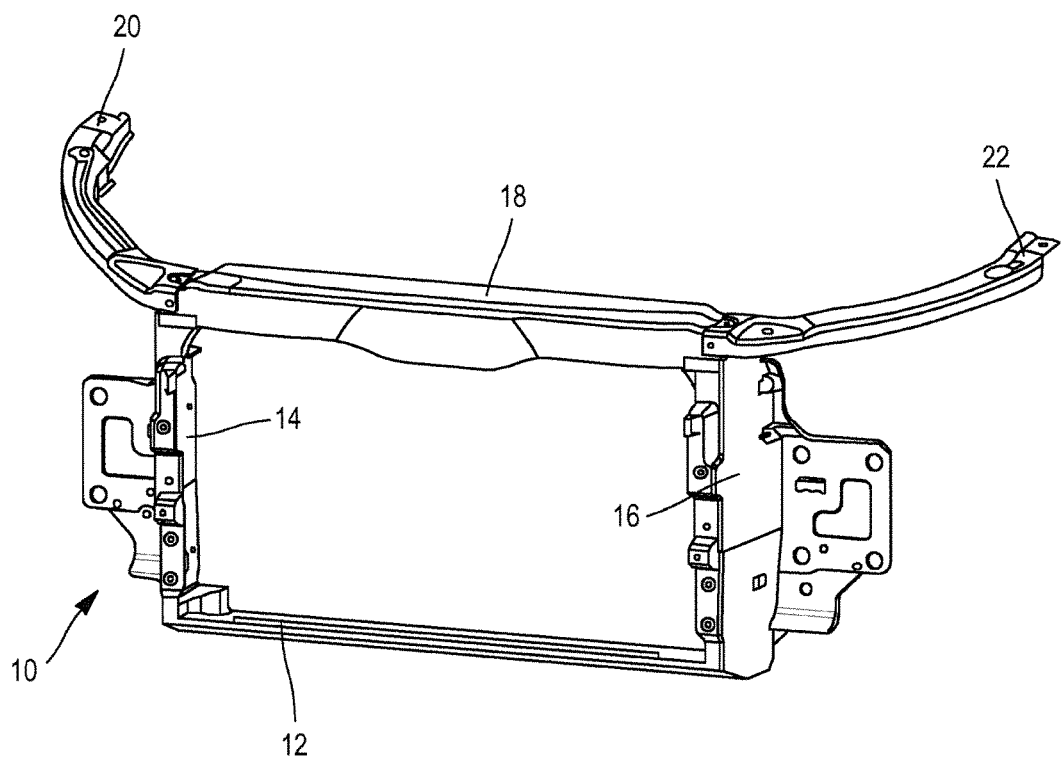
FIG. 2 shows an assembled and perspective view of the supporting structure according to FIG. 1.

FIG. 2 shows the supporting structure 10 according to the first embodiment of the invention, with the first and second support wings 20, 22 assembled on the upper crossmember 18.

Figure 3:
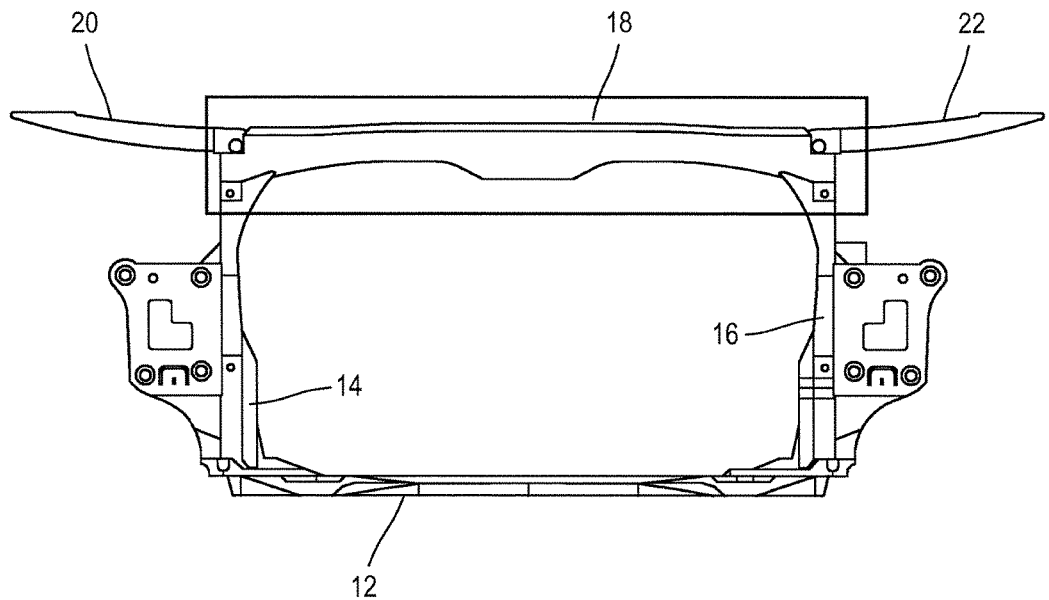
FIG. 3 shows a front view of the supporting structure according to FIG. 1.

FIG. 3 shows a face-on view of the supporting structure 10 assembled with the first and second support wings 20, 22.

Figure 4:
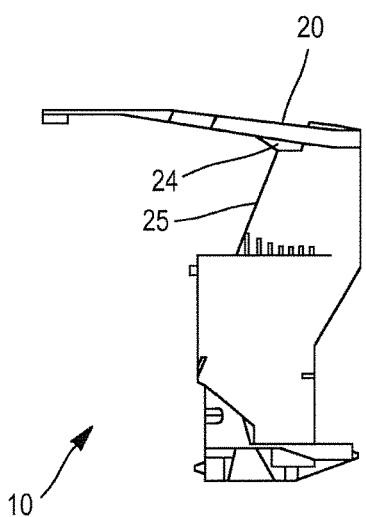
FIG. 4 shows a front view of a support wing fixed to part of the front end module supporting structure according to one embodiment of the present invention.

FIG. 4 shows in detail the connection between the first support wing 20, shown in FIGS. 1, 2 and 3, and a portion (shown in part) of the supporting structure 10. As shown in FIG. 4, the first support wing 20 may comprise a support piece 24, for connecting said first support wing 20 to the supporting structure 10 by means of a connecting element 25. The support piece 24 may be produced by means of an insert made from a metallic material and covered, by the end of an overmolding process, with a plastics material.

The second support wing 22 is connected to the supporting structure 10 in a similar way to the first support wing 20, by means of a support piece (not shown) and of a connecting element (not shown).

Thus, the supporting structure 10 may comprise, on the one hand, a metallic insert located within the upper crossmember 18 and, on the other hand, a metallic insert located in the support piece 24 for the connecting of the first support wing 20 and a metallic insert located in the support part of the second support wing 22. Thus, the presence of all the metallic inserts guarantees the supporting structure 10 a level of stiffness and strength on the one hand in the region of the upper crossmember 18 and, on the other, in the region of the fixing of the first and second support wing 20, 22.

The supporting structure 10 thus formed has a weight that is reduced by the order of 30 to 40% in comparison with the weight of a supporting structure according to the prior art. Thus, the supporting structure 10 according to the present invention makes it possible to reduce the fuel consumption of the motor vehicle and, therefore, to reduce the carbon dioxide ($CO_2$) emissions.

The supporting structure 10 according to the present invention therefore makes it possible to combine relative stiffness with regard to protecting a pedestrian in the event of a frontal impact with relative flexibility to absorb any vibration that might be experienced by the devices within the front end module when the motor vehicle is moving along. In addition, a supporting structure according to the invention requires a limited number of steps in its manufacture as compared with the number of steps needed to manufacture an all-metallic supporting structure according to the state of the art.

The invention claimed is:

1. A supporting structure for a motor vehicle front end module, comprising:
   a lower crossmember;
   a first lateral upright;
   a second lateral upright;
   an upper crossmember that defines a frame, said upper crossmember being formed of a hybrid material comprising a plastics material and a metallic material;
   a support wing fixed to one end of the upper crossmember; and
   a support piece for connecting the support wing to the upper crossmember, the support piece comprising an insert made of a hybrid material comprising a plastics material and a metallic material,
   wherein the lower crossmember, the first lateral upright, and the second lateral upright are made entirely from a plastics material.

2. The supporting structure as claimed in claim 1, wherein the upper crossmember comprises an insert made from a metallic material and covered with a plastics material.

3. The supporting structure as claimed in claim 1, the support wing being made of a metallic material.

4. A front end module of a motor vehicle comprising:
   a supporting structure comprising:
      a lower crossmember;
      a first lateral upright;
      a second lateral upright;
      an upper crossmember that defines a frame, said upper crossmember being formed of a hybrid material comprising a plastics material and a metallic material;
      a support wing fixed to one end of the upper crossmember; and
      a support piece for connecting the support wing to the upper crossmember, the support piece comprising an insert made of a hybrid material comprising a plastics material and a metallic material,
   wherein the lower crossmember, the first lateral upright, and the second lateral upright are made entirely from a plastics material.

5. The supporting structure as claimed in claim 1, wherein the plastics material is fiber-reinforced.

* * * * *